United States Patent [19]

Horacek et al.

[11] 4,258,140

[45] Mar. 24, 1981

[54] STORAGE-STABLE PREPOLYMERS SPRAYABLE FROM A PRESSURE VESSEL

[75] Inventors: Heinrich Horacek, Ludwigshafen; Robert Gehm, Limburgerhof; Otto Volkert, Weisenheim; Sarbananda Chakrabarti, Ludwigshafen; Mathias Pauls, Geiselbullach; Peter Weyland, Frankenthal, all of Fed. Rep. of Germany

[73] Assignee: BASF Aktiengesellschaft, Fed. Rep. of Germany

[21] Appl. No.: 24,828

[22] Filed: Mar. 28, 1979

[51] Int. Cl.$^3$ .................... C08G 18/14; C08G 18/76; C08G 18/48

[52] U.S. Cl. .................... 521/114; 521/131; 521/164; 521/167; 521/917; 521/160

[58] Field of Search ............... 521/114, 164, 160, 167, 521/131, 917

[56] References Cited

U.S. PATENT DOCUMENTS

| | | | |
|---|---|---|---|
| 3,029,208 | 4/1962 | Khawam | 521/167 |
| 3,112,281 | 11/1963 | Gromacki et al. | 521/167 |
| 3,640,997 | 2/1972 | Fijal | 521/167 |
| 3,830,760 | 8/1974 | Bengtson | 260/2.5 BD |

FOREIGN PATENT DOCUMENTS 1086609 10/1967 United Kingdom .
1175717 12/1967 United Kingdom .

*Primary Examiner*—H. S. Cockeram
*Attorney, Agent, or Firm*—Keil & Witherspoon

[57] ABSTRACT

A process for the manufacture of dimensionally stable polyurethane foams by releasing, and curing by interaction with the atmosphere, a mixture, which is under pressure, of prepolymers, containing isocyanate groups, and blowing agents, with or without assistants and additives, wherein the prepolymers, containing isocyanate groups, are obtained by reaction of organic polyisocyanates with difunctional to octafunctional polyester-polyols and/or polyether-polyols, containing chemically bonded tertiary amino groups in the polymer chain, or, preferably, with mixtures of such polyester-polyols and/or polyether-polyols and nitrogen-free polyester-polyols and/or polyether-polyols.

6 Claims, No Drawings

STORAGE-STABLE PREPOLYMERS SPRAYABLE FROM A PRESSURE VESSEL

The present invention relates to a process for the manufacture of dimensionally stable polyurethane foams by releasing a storage-stable mixture, which is under pressure, of prepolymers, containing isocyanate groups, and blowing agents, with or without assistants and additives, and allowing it to cure by reaction with the atmosphere, wherein the prepolymers containing isocyanate groups are obtained by reaction of organic polyisocyanates with difunctional to octafunctional polyester-polyols and/or polyether-polyols, containing chemically bonded tertiary amino groups in the polymer chain, or, preferably with mixtures of such polyester-polyols and/or polyether-polyols and nitrogen-free polyester-polyols and/or polyether-polyols in certain ratios.

Polyurethane foams are usually prepared by the prepolymer process and preferably by the one-shot process. For this purpose, the reactants, for example prepolymers containing isocyanate groups, or polyisocyanates, and polyols, together with blowing agents and catalysts and with or without assistants and additives, are fed in metered amounts, separately or in the form of mixtures, to a mixing device, for example a mixing head, thoroughly mixed therein and poured, from dispensing devices, into molds or into cavities which are to be filled, in which the mixture foams up and cures.

It is also known to manufacture polyurethane foams from two-component systems, where component A preferably contains the organic polyol, the catalyst, blowing agents and additives and component B consists of polyisocyanates, with or without further assistants. The two components are separately stored in multi-compartment containers, preferably two-compartment containers. Before processing, the partition between the two compartments is destroyed and components A and B are mixed, after which the foamable mixture is processed.

According to disclosures of British Pat. Nos. 1,086,609 and 1,175,717, the components A and B can be separately introduced into aerosol cans, stored, mixed by means of a suitable device and discharged from the can as a foamable mixture. A disadvantage of the process described is that it uses an expensive multi-compartment container with a mixing device, and that the entire contents of the can must be processed at once, since the mixture of components A and B cannot be stored.

U.S. Pat. No. 3,830,760 also describes the manufacture of foamable polyurethane mixtures, but the mixtures of curable polymer or polymer intermediate and an inert blowing agent which is soluble in the polymer is accommodated in a container from which any desired amounts of foam, within the limit of the capacity of the container, can be dispensed. Though the one-component foam allows convenient and advantageous processing—for example it can be discharged from the aerosol can without weighing and mixing—this process also has certain disadvantages. For example, the polyurethane mixture described in U.S. Pat. No. 3,830,760 has only a limited shelf life, the viscosity of the mixture rises relatively rapidly, and the contents of the can solidify on prolonged storage. It is a further disadvantage that the foamed polyurethane mixture reacts with the atmosphere, and cures, relatively slowly, so that the polyurethane foam may undergo post-expansion. This can lead to distortion of articles which have been filled with foam, for example door frames or window frames.

It is an object of the present invention to provide dimensionally stable polyurethane foams obtained from a foamable polyurethane mixture which has a shelf life of at least 18 months at room temperature, can be stored in a single container and can be foamed by releasing the mixture.

We have found that this object is achieved by a process for the manufacture of dimensionally stable polyurethane foams by releasing, and curing by interaction with the atmosphere, preferably with atmospheric moisture, a storage-stable mixture, which is under pressure, of prepolymers which contain isocyanate groups and are based on polyols and organic polyisocyanates, and blowing agents, with or without assistants and additives, wherein the polyols used are difunctional to octafunctional polyester-polyols and/or polyether-polyols which have a hydroxyl number of from 40 to 500 and contain chemically bonded tertiary amino groups in the polymer chain, or mixtures of such polyester-polyols and/or polyether-polyols, containing tertiary amino groups, with nitrogen-free polyester-polyols and/or polyether-polyols.

The reaction, according to the invention, of the polyfunctional nitrogen-containing polyester-polyols and/or polyether-polyols or, preferably, of the mixtures of polyfunctional nitrogen-containing and nitrogen-free polyester-polyols and/or polyether-polyols, with organic polyisocyanates gives prepolymers containing isocyanate groups, which after foaming react rapidly with the atmosphere and cure to give dimensionally stable polyurethane foams.

Since, according to the invention, the foamable mixtures do not contain any conventional low molecular weight monomeric polyurethane catalysts, for example catalysts with molecular weights of less than 300, such as tertiary amines, salts of organic acids, organic tin compounds and the like, the mixtures have an extremely long shelf life, ie. of more than 18 months, at room temperature.

It is a further advantage that blowing agents which can be used are not only fluorochloromethanes, such as monofluorotrichloromethane, difluoromonochloromethane and difluorodichloromethane and their mixtures, but also hydrocarbons which do not pollute the environment; preferably, mixtures of fluorochloromethanes and hydrocarbons are employed.

As has already been explained, the prepolymers containing isocyanate groups, which have an NCO content of from 5 to 25 percent by weight, preferably from 10 to 20 percent by weight, based on the weight of the prepolymer, are prepared by reaction of preferably aromatic polyisocyanates with the polyols, or polyol mixtures, containing tert.-amino groups, according to the invention.

Examples of aromatic polyisocyanates are mixtures of toluylene diisocyanates, such as 2,4- and/or 2,6-toluylene diisocyanate and diphenylmethane-diisocyanates and polyphenylpolymethylene-polyisocyanates (crude MDI). Preferably, a mixture of polyphenylpolymethylene polyisocyanates and diphenylmethane diisocyanates (crude MDI), containing from 90 to 40 percent by weight, preferably from 80 to 50 percent by weight, based on the total weight of the mixture, of diphenylmethane diisocyanate isomers, is used.

The nitrogen-containing polyols used are difunctional to octafunctional, preferably trifunctional or tetrafunctional, polyester-polyols and/or, preferably, polyether-polyols, which have hydroxyl numbers of from 40 to 500, preferably from 40 to 200, and which contain at least one, preferably from 1 to 6, chemically bonded tertiary amino groups in the polymer chain. Suitable nitrogen-containing polyester-polyols which have molecular weights of from 500 to 5,000, preferably from 1,000 to 4,000, can be prepared, for example, from polycarboxylic acids, preferably dicarboxylic acids, and dialkanolamines and/or trialkanolamines, eg. diisopropanolamine and/or triisopropanolamine, which may or may not be mixed with polyhydric alcohols, or from polycarboxylic acids and mixtures of polyamines, eg. ethylenediamine, diethylenetriamine or N-methylethylenetriamine, and polyhydric alcohols. Examples of polycarboxylic acids are glutaric acid, sebacic acid, phthalic acid, isophthalic acid, terephthalic acid and, preferably, succinic acid and adipic acid. Examples of polyhydric alcohols are ethylene glycol, 1,3- and 1,2-propanediol, 1,4-butanediol, 1,6-hexanediol, diethylene glycol, dipropylene glycol, glycerol, trimethylolpropane and pentaerythritol.

Preferably, however, nitrogen-containing polyether-polyols having molecular weights of from 500 to 5,000, preferably from 1,000 to 4,000, are used. These can be prepared by conventional methods from one or more alkylene oxides, where alkylene is of 2 to 4 carbon atoms, and a starter molecule which contains an amino group and possesses from 2 to 8, preferably 3 or 4, active hydrogen atoms. Examples of suitable alkylene oxides are 1,3-propylene oxide, 1,2- and 2,3-butylene oxide, styrene oxide and, preferably, ethylene oxide and 1,2-propylene oxide. The alkylene oxides may be used individually, in alternating succession, or as mixtures. Examples of suitable starter molecules containing amino groups are ammonia, hydrazine, monoalkylhydrazines and dialkylhydrazines, where alkyl is of 1 to 6 carbon atoms, guanidine, substituted guanidines, diamines, N-monoalkyl-, N,N-dialkyl- and N,N'-dialkyl-diamines, where alkyl is of 1 to 6 carbon atoms, such as ethylenediamine, 1,2- and 1,3-propylenediamine, butylenediamine, hexamethylenediamine, 2,4- and 2,6-toluylenediamine, and 4,4'-, 2,4'- and 2,2'-diaminodiphenylmethane, and aminoalcohols, eg. monoethanolamine, diethanolamine and triethanolamine. Preferred starter molecules containing amino groups are triethanolamine, alkylenediamines, dialkylenetriamines, trialkylenetetramines and low molecular weight polyethylenediamines.

In another embodiment of the process, nitrogen-containing polyether-polyols can be prepared from nitrogen-free starter molecules, alkylene oxides and, for example, dibutylaminoglycidol, so that the nitrogen is not in the main polymer chain but in the side chain.

The difunctional to octafunctional polyester-polyols and polyether-polyols, containing tertiary amino groups, may be used as such or as mixtures.

Preferably, however, the polyols used are mixtures of the above difunctional to octafunctional polyester-polyols and/or polyether-polyols, containing tertiary amino groups, with nitrogen-free difunctional to octafunctional, preferably tetrafunctional and trifunctional, polyester-polyols and/or polyether-polyols having hydroxyl numbers of from 40 to 500, preferably from 200 to 400. Suitable nitrogen-free polyester-polyols have molecular weights of from 400 to 4,000, preferably from 500 to 2,000, and can be prepared, for example, from the above polycarboxylic acids, preferably dicarboxylic acids, and polyhydric alcohols, preferably diols.

Preferably, however, conventional nitrogen-free polyether-polyols having molecular weights of from 400 to 4,000, preferably from 400 to 2,000, are used in the polyol mixture according to the invention. The polyether-polyols are prepared by conventional methods from one or more of the above alkylene oxides and a nitrogen-free starter molecule. Examples of suitable nitrogen-free starter molecules are water, phosphoric acid, polycarboxylic acids, especially dicarboxylic acids, such as adipic acid, succinic acid, phthalic acid and terephthalic acid, and, preferably polyhydroxy compounds, such as ethylene glycol, propylene glycol, diethylene glycol, pentaerythritol, sorbitol, sucrose and, preferably, glycerol and trimethylolpropane. The nitrogen-free polyether-polyols may have straight or branched chains.

To produce the dimensionally stable single-component polyurethane foams, it has proved advantageous to use polyol mixtures which comprise
(a) from 10 to 90% by weight, preferably from 50 to 70% by weight, based on the total weight of the polyol mixture, of a difunctional to octafunctional polyester-polyol and/or polyether-polyol which has a hydroxyl number of from 40 to 500 and contains one or more chemically bonded tertiary amino groups in the polymer chain and
(b) from 90 to 10% by weight, preferably from 50 to 30% by weight, based on the total weight of the polyol mixture, of a difunctional to octafunctional, nitrogen-free polyester-polyol and/or polyether-polyol having a hydroxyl number of from 40 to 500.

To prepare the prepolymers containing isocyanate groups, the organic polyisocyanates are reacted with the nitrogen-containing polyol or polyol mixture according to the invention at from 0° to 100° C., preferably from 20° to 60° C., in a ratio such that from 2 to 10, preferably from 4 to 8, NCO groups are present in the reaction mixture per hydroxyl group.

In the process according to the invention, the blowing agents used are low-boiling liquids which rapidly evaporate when the mixture is released, and which are inert toward the other constituents of the mixture. Examples of suitable blowing agents are halohydrocarbons boiling at below 50° C., preferably at from −50° to 30° C., under atmospheric pressure, eg. monochlorodifluoromethane, dichloromonofluoromethane, dichlorodifluoromethane and trichlorofluoromethane and mixtures of these, in particular mixtures comprising from 30 to 80% by weight of monochlorodifluoromethane or dichlorodifluoromethane and from 70 to 20% by weight of trichloromonofluoromethane or dichloromonofluoromethane, the percentages by weight being based on the total weight of the mixture (the halohydrocarbons being used in amounts of from 20 to 30% by weight, preferably from 23 to 28% by weight, based on the weight of the prepolymer containing isocyanate groups), hydrocarbons and dialkylethers boiling at below 50° C., preferably at from −50° to 30° C., under atmospheric pressure, eg. propane and especially isobutane, and dimethyl ether (these blowing agents being used in amounts of from 5 to 25 percent by weight, preferably from 10 to 20 percent by weight, based on the weight of the prepolymer containing isocyanate groups). However, preferred blowing agents are mixtures of the above halohydrocarbons and hydrocarbons in the weight ratio of from 90:10 to 50:50, preferably from 90:10 to 80:20, in particular mixtures of dichlorodifluoromethane with propane, isobutane or dimethyl ether. The amount of blowing agent mixture required can easily be calculated, in accordance with the ratio of halohydrocarbon to hydrocarbon, from the data given above for the individual components. The blowing agents are present virtually entirely in the liquid form in the storage-stable mixture which is under pressure.

If desired, assistants and additives may also be incorporated into the storage-stable, foamable mixture. Examples are surfactants, plasticizers, flameproofing agents, pore regulators, UV absorbers, dyes and anti-hydrolysis agents.

By way of example, surfactants which assist the homogenization of the starting materials and may also serve to regulate the cell structure of the foams can be used. Specific examples are siloxane-oxyalkylene copolymers and other organopolysiloxanes, oxyethylated alkylphenols, oxyethylated fatty alcohols, paraffin oils, castor oil esters, ricinoleic acid esters and turkey red oil, these being employed in amounts of from 0.1 to 10 percent by weight, based on the weight of prepolymer containing isocyanate groups.

It can also be advantageous to incorporate a plasticizer into the reaction mixture so that the tendency of the products to brittleness is reduced. Conventional plasticizers can be used but it is particularly advantageous to employ those which contain phosphorus atoms and/or halogen atoms and hence additionally increase the flame repellency of the polyurethane plastics. Amongst the latter plasticizers are tricresyl phosphate, tris-2-chloroethyl phosphate, tris-$\beta$-chloropropyl phosphate and tris-2,3-dibromopropyl phosphate.

In addition to the above halogen-substituted phosphates, the following may, for example, be used as flame-proofing agents: chloroparaffins, halophosphites, ammonium phosphate and halogen-containing and phosphorus-containing resins.

The storage-stable, foamable mixture of prepolymers containing isocyanate groups and of blowing agents, with or without assistants and additives, may for example be prepared in bulk in pressure kettles and then be packaged in suitable containers of various sizes, for example aerosol cans of from 0.25 to 5 liters capacity or pressure vessels of from 50 to 100 liters capacity, such as those conventionally employed for industrial purposes. However, it is also possible to prepare the prepolymer, containing isocyanate groups, from polyisocyanates and the nitrogen-containing polyols or the polyol mixture directly in the appropriate pressure vessels in the presence of the blowing agent, or to introduce the blowing agent subsequently into the pressure vessel.

To prepare the dimensionally stable polyurethane foam, the storage-stable mixture, which is under pressure, of the prepolymers containing isocyanate groups, and of blowing agents, with or without assistants and additives, is brought to atmospheric pressure by means of a suitable device, for example a valve. On releasing the pressure, the mixture foams up and cures rapidly by reaction with the atmosphere, in particular by reaction with the water vapor contained in the latter. As a result of the use of the nitrogen-containing polyols or polyol mixture according to the invention, a relatively pressure-resistant and dimensionally stable closed-cell polyurethane foam is formed rapidly. Post-expansion of the foam due to diffusion of blowing agent, air and the carbon dioxide formed during the curing reaction is thereby virtually completely suppressed, especially if blowing agent mixtures of halohydrocarbons and hydrocarbons are used.

The storage-stable, foamable mixtures according to the invention may be used for the manufacture of dimensionally stable one-component polyurethane foams which can serve as sealants, crack fillers, insulating materials and the like.

The Examples which follow, and in which parts are by weight, illustrate the invention.

EXAMPLES 1 TO 20 AND COMPARATIVE EXAMPLES A AND B

The starting materials summarized in the Tables which follow, in the amounts (parts) shown, are introduced, at room temperature, into a pressure vessel equipped with a safety valve, and are mixed thoroughly. The reactive mixture is allowed to foam up by releasing the pressure.

TABLE

| Example | | 1 | 2 | 3 | 4 | 5 |
|---|---|---|---|---|---|---|
| Starting materials | Molecular weight (g/mole) | | | | | |
| Oxypropylated glycerol | 720 | | | | 20 | |
| Oxypropylated glycerol | 1,500 | | | | | |
| Oxypropylated trimethylolpropane | 400 | | | | | |
| | 430 | 25 | 25 | 25 | | |
| | 3,450 | | | | | 45 |
| Oxypropylated triethanolamine | 720 | | | | | |
| | 1,500 | | | | 80 | |
| | 3,400 | | | 43 | | |
| Oxpropylated ethylenediamine | 3,750 | 43 | | | | |
| Oxypropylated glycerol plus | 4,000 | | | | | |
| N,N-dibutylglycidylamine | 4,200 | | | | 43 | |
| | 4,800 | | | | | |
| Polyester of adipic acid, ethylene glycol, diethanolamine and triethanolamine | 640 | | | | | 15 |
| | 2,000 | | | | | |
| | 4,500 | | | | | |
| Crude MDI | | 150 | 150 | 150 | 120 | 150 |
| Tris-2-chloroethyl phosphate | | 25 | 25 | 25 | 25 | 25 |
| Siloxane-oxyalkylene copolymer | | 6 | 6 | 6 | 6 | 6 |
| N,N-Dimethylcyclohexylamine | | | | | | |
| Monofluorotrichloromethane | | | | | | |
| Difluorodichloromethane | | 50 | 50 | 50 | 50 | 50 |
| Monofluorodichloromethane | | | | | | |
| Difluoromonochloromethane | | | | | | |

TABLE -continued

| Example | 1 | 2 | 3 | 4 | 5 |
|---|---|---|---|---|---|
| Dimethyl ether | | | | 12 | 12 | 12 |
| iso-Butane | 15 | | | | |
| Propane | | | 15 | | |
| Properties | | | | | |
| Density of the rigid foam (kg/m$^3$) | 20 | 20 | 25 | 35 | 30 |
| Setting time (hours) | 2 | 2 | 2 | 3 | 3 |
| Curing time (hours) | 5 | 5 | 5 | 6 | 8 |
| Shelf life at 60° C. (d) | >60 | >60 | >60 | >60 | >60 |
| Post-expansion of a sandwich sample $^+$(%) | 0–10 | 0–10 | 0–10 | 0–5 | 0–5 |

$^+$ Sheet metal strips: 20 cm long, 5 cm wide, sheet spacing $l_0$ 3 cm, maximum or minimum spacing of the sheets l, % = [($l-l_0$)$l_0$].100 (22° C., 60% relative atomospheric humidity)

TABLE 2

| Example | Molecular weight (g/mole) | 6 | 7 | 8 | 9 | 10 |
|---|---|---|---|---|---|---|
| Starting materials | | | | | | |
| Oxypropylated glycerol | 720 | | | | | |
| Oxypropylated glycerol | 1,500 | | | | | |
| Oxypropylated trimethylolpropane | 400 | | | | | 20 |
| | 430 | 25 | 15 | | | |
| | 3,450 | | | | | |
| Oxypropylated Treithandamine | 720 | | | 40 | | |
| | 1,500 | | | | 100 | |
| | 3,400 | | | | | |
| Oxypropylated ethylenediamine | 3,750 | 43 | | | | |
| Oxypropylated glycerol plus | 4,000 | | | | | 80 |
| N,N-dibutylglycidylamine | 4,200 | | | | | |
| | 4,800 | | | | | |
| Polyeser of adipic acid, ethylene | 640 | | | | | |
| glycol, diethanolamine and | 2,000 | | | | | |
| triethanolamine | 4,500 | | 53 | | | |
| Crude MDI | | 150 | 150 | 120 | 150 | 150 |
| Tris-2-chloroethyl phosphate | | 25 | 25 | 25 | 25 | 25 |
| Siloxane-oxyalkylene copolymer | | 6 | 6 | 6 | 6 | 6 |
| N,N-Dimethylcyclohexylamine | | | | | | |
| Monofluorotrichloromethane | | | | 42 | | |
| Difluorodichloromethane | | 42 | 42 | | | |
| Monofluorodichloromethane | | 42 | 42 | | | |
| Difluoromonochloromethane | | | | 42 | 80 | 50 |
| Dimethyl ether | | | | | | 12 |
| iso-Butane | | | | | | |
| Propane | | | | | | |
| Properties | | | | | | |
| Density of the rigid foam (kg/m$^3$) | | 20 | 25 | 30 | 25 | 30 |
| Setting time (hours) | | 2 | 3 | 2 | 2 | 1 |
| Curing time (hours) | | 5 | 5 | 6 | 5 | 6 |
| Shelf life at 60° C. (d) | | >60 | >60 | >60 | >60 | >60 |
| Post-expansion of sandwich sample $^+$ (%) | | 0–10 | 0–5 | 0–5 | 0–10 | 0–10 |

$^+$ Sheet metal strips: 20 cm long, 5 cm wide, sheet spacing $l_0$ 3 cm, maximum or minimum spacing of the sheets l, % = [($l-l_0$)$l_0$].100 (22° C., 60% relative atomospheric humidity)

TABLE 3

| Example | Molecular weight (g/mole) | 11 | 12 | 13 | 14 | 15 |
|---|---|---|---|---|---|---|
| Starting materials | | | | | | |
| Oxypropylated glycerol | 720 | | | | | |
| Oxypropylated glycerol | 1,500 | | | | | |
| Oxpropylated trimethylolpropane | 400 | 10 | | | 25 | 25 |
| | 430 | | 25 | 25 | | |
| | 3,450 | | | | | |
| Oxypropylated triethanolamine | 720 | | | | | |
| | 1,500 | | | | | |
| | 3,400 | | | | | |
| Oxypropylated ethylenediamine | 3,750 | | | | 43 | |
| Oxypropylated glycerol plus | 4,000 | 90 | | | | |
| N,N-dibutylglycidylamine | 4,200 | | 43 | | | |
| | 4,800 | | | 43 | | 43 |
| Polyester of adipic acid, ethylene | 640 | | | | | |
| glycol, diethanolamine and | 2,000 | | | | | |
| triethanolamine | 4,500 | | | | | |
| Crude MDI | | 150 | 150 | 150 | 150 | 150 |
| Tris-2-chloroethyl phosphate | | 25 | 25 | 25 | 25 | 25 |
| Siloxane-oxyalkylene copolymer | | 6 | 6 | 6 | 6 | 6 |

TABLE 3-continued

| Example | 11 | 12 | 13 | 14 | 15 |
|---|---|---|---|---|---|
| N,N-Dimethylcyclohexylamine | | | | | |
| Monofluorotrichloromethane | | 42 | | 42 | |
| Difluorodichloromethane | 50 | | 50 | 42 | |
| Monofluorodichloromethane | | | | | |
| Difluoromonochloromethane | | | 42 | | 50 |
| Dimethyl ether | 12 | | | | |
| iso-Butane | | | | | 15 |
| Propane | | | | 15 | |
| Properties | | | | | |
| Density of the rigid foam (kg/m$^3$) | 25 | 25 | 25 | 25 | 30 |
| Setting time (hours) | 1 | 2 | 2 | 3 | 1 |
| Curing time (hours) | 6 | 8 | 5 | 6 | 6 |
| Shelf life at 60° C. (d) | 60 | 60 | 60 | 60 | 60 |
| Post-expansion of a sandwich sample + (%) | 5-10 | 5-10 | 10-5 | 0-10 | 0-10 |

+Sheet metal strips: 20 cm long, 5 cm wide, sheet spacing $l_0$ 3 cm, maximum or minimum spacing of the sheets 1, % = [(1-$l_0$)$l_0$].100 (22° C., 60% relative atmospheric humidity)

TABLE 4

| Example | Molecular weight (g/mole) | 16 | 17 | 18 | 19 | 20 | A | B |
|---|---|---|---|---|---|---|---|---|
| Starting materials | | | | | | | | |
| Oxypropylated glycerol | 720 | | 20 | | | 40 | | |
| Oxypropylated glycerol | 1,500 | | | | | | | 100 |
| Oxypropylated trimethylolpropane | 400 | | | 25 | | | | |
| | 430 | | | | 15 | | | |
| | 3,450 | | | | | 45 | | |
| Oxypropylated triethanolamine | 720 | | | | | | | |
| | 1,500 | | | | | | | |
| | 3,400 | | | | | | | |
| Oxypropylated ethylenediamine | 3,750 | | | 43 | | | | |
| Oxypropylated glycerol plus | 4,000 | | | | | | | |
| N,N-dibutylglycidylamine | 4,200 | | | | | | | |
| | 4,800 | | | | | | | |
| Polyester of adipic acid, ethylene | 640 | | | | | 20 | | |
| glycol, diethanolamine and | 2,000 | 100 | 80 | | | | | |
| triethanolamine | 4,500 | | | | 53 | | | |
| Crude MDI | | 150 | 120 | 150 | 150 | 150 | 120 | 150 |
| Tris-2-chloroethyl phosphate | | 25 | 25 | 25 | 25 | 25 | 25 | 50 |
| Siloxane-oxyalkylene copolymer | | 6 | 6 | 6 | 6 | 6 | 2 | 2 |
| N,N-Dimethylcyclohexylamine | | | | | | | 0.6 | 0.6 |
| Monofluorotrichloromethane | | | | | | 42 | 30 | |
| Difluorodichloromethane | | 50 | 50 | 90 | 50 | 42 | 90 | 150 |
| Monofluorodichloromethane | | | | | | | | |
| Difluoromonochloromethane | | | | | | | | |
| Dimethyl ether | | | | | 12 | | | |
| iso-Butane | | 15 | | | | | | |
| Propane | | | 15 | | | | | |
| Properties | | | | | | | | |
| Density of the rigid foam (kg/m$^3$) | | 25 | 30 | 35 | 20 | 30 | 30 | 35 |
| Setting time (hours) | | 3 | 2 | 1 | 1 | 2 | 1 | 5 |
| Curing time (hours) | | 6 | 8 | 5 | 6 | 5 | 10 | 10 |
| Shelf life at 60° C. (d) | | 60 | 60 | 60 | 60 | 60 | 14 | 14 |
| Post-expansion of a sandwich sample + (%) | | 5-10 | 5-10 | 0-10 | 0-5 | 0-5 | 5-15 | 5-15 |

+Sheet metal strips: 20 cm long, 5 cm wide, sheet spacing $l_0$ 3 cm, maximum or minimum spacing of the sheets 1, % = [(1-$l_0$)$l_0$].100 (22° C., 60% relative atmospheric humidity)

We claim:

1. In the process for the manufacture of a dimensionally stable polyurethane foam by releasing the pressure on a mixture of prepolymers which is held in a one-compartment container under greater than atmospheric pressure and thereafter curing said foam by interaction with the atmosphere, the improvement comprising employing a mixture of prepolymers which has a shelf life of at least 60 days at 60° C., said prepolymers containing isocyanate groups and being admixed with blowing agents, wherein the prepolymers used, having an NCO content of from 5 to 25 percent by weight, based on the weight of the prepolymer are prepared by the reaction of a mixture of diphenylmethane-diisocyanates and polyphenyl-polymethylene-polyisocyanates with trifunctional or tetrafunctional polyols having a hydroxyl number of from 40 to 500 and a molecular weight of from 500 to 5000, and containing chemically bonded tertiary amino groups in the polymer chain, which polyols are selected from the group consisting of polyester-polyols, polyether-polyols and mixtures thereof, or by reaction of mixtures of such polyols with nitrogen-free polyester-polyols and/or polyether-polyols.

2. A process as set forth in claim 1, wherein the polyols used are mixtures which comprise
    (a) from 90 to 10% by weight of a difunctional to octafunctional polyester-polyol and/or polyether-polyol which has a hydroxyl number of from 40 to 500 and contains chemically bonded tertiary amino groups in the polymer chain, and
    (b) from 10 to 90% by weight of a difunctional to octafunctional nitrogen-free polyester-polyol and- /or polyether-polyol which has a hydroxyl number of from 40 to 500, the percentages by weight being based on the total weight of the polyol mixture.

3. A process as set forth in claim 1, wherein the blowing agents used are mixtures of dichlorodifluoromethane and isobutane, propane or dimethyl ether.

4. A process as set forth in claim 3, wherein the blowing agent mixture comprises from 50 to 90 percent by weight of dichlorodifluoromethane and from 50 to 10 percent by weight of isobutane, propane or dimethyl ether, the percentages by weight being based on the total weight of the blowing agent mixture.

5. A process as set forth in claim 1, wherein the blowing agent is virtually completely in the liquid form.

6. A process as set forth in claim 1, wherein the reaction is carried out in the absence of conventional low molecular weight polyurethane catalysts.

* * * * *